Figure 1:
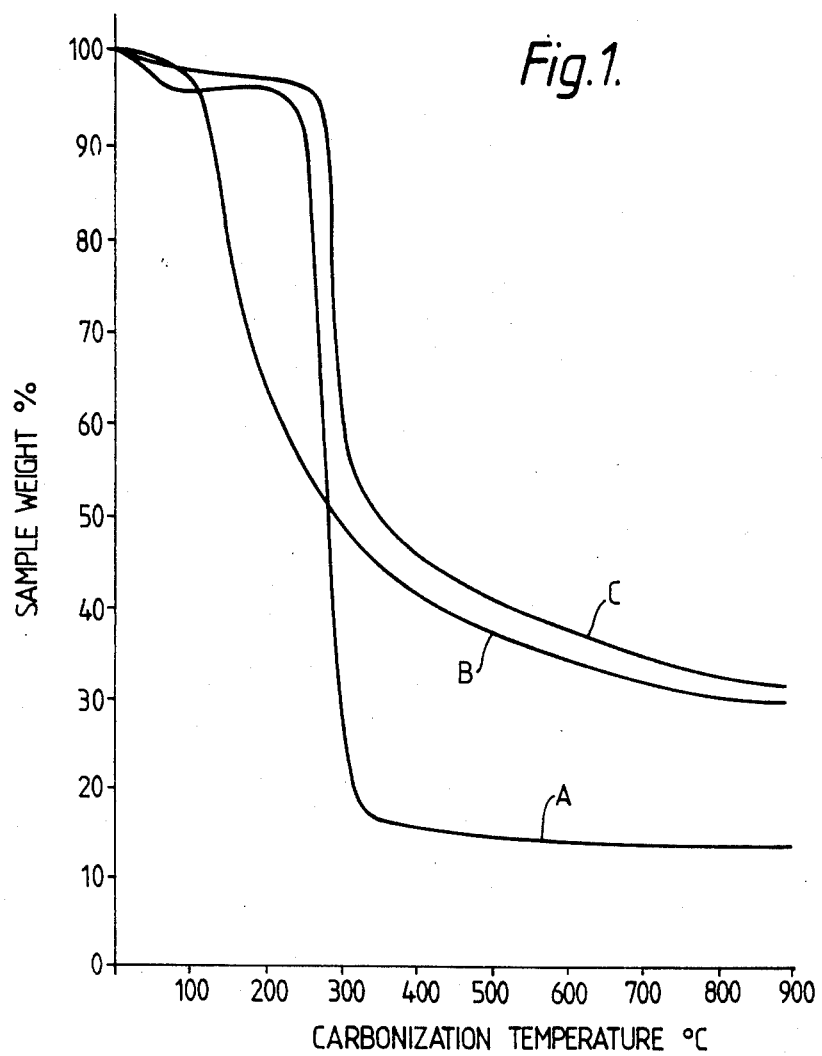

United States Patent [19]

Sing et al.

[11] Patent Number: 4,699,896
[45] Date of Patent: Oct. 13, 1987

[54] MANUFACTURE OF FIBROUS ACTIVATED CARBONS

[75] Inventors: Kenneth S. W. Sing, High Wycombe; Frederick G. R. Gimblett, Reading; John J. Freeman, Southall, all of England

[73] Assignee: The Secretary of State for Defence in Her Britannic Majesty's Government of the United Kingdom of Great Britain and Northern Ireland, London, England

[21] Appl. No.: 774,477

[22] Filed: Sep. 10, 1985

[30] Foreign Application Priority Data

Sep. 11, 1984 [GB] United Kingdom ................. 8422875

[51] Int. Cl.$^4$ .............................................. B05D 3/02
[52] U.S. Cl. .................................. 502/423; 264/29.2; 264/29.4; 423/447.5; 423/447.7; 423/447.8; 423/447.9; 427/227; 427/324; 427/380; 427/381; 502/184

[58] Field of Search ............... 427/227, 381, 324, 380; 502/184, 428; 423/447.5, 447.7–447.9; 8/115.6; 264/29.2, 29.4

[56] References Cited

U.S. PATENT DOCUMENTS

| | | | |
|---|---|---|---|
| 3,385,915 | 5/1968 | Hamling | 427/227 |
| 3,542,582 | 11/1970 | Degginger | 427/227 |
| 3,847,833 | 11/1974 | Bailey et al. | 423/447.9 |
| 4,409,125 | 10/1983 | Nishino et al. | 423/447.9 |

Primary Examiner—Janyce A. Bell
Attorney, Agent, or Firm—Stevens, Davis, Miller & Mosher

[57] ABSTRACT

A method of preparing a fibrous activated carbon including the steps of carbonizing and activating cellulose fibre at temperatures between 200° C. and 1000° C. in an inert atmosphere, characterized in that, prior to activation, the fibre is impregnated with an impregnating material comprising, in the form of one or more compounds, boron and at least one alkali metal.

15 Claims, 5 Drawing Figures

MANUFACTURE OF FIBROUS ACTIVATED CARBONS

This invention relates to the manufacture of fibrous activated carbons for use as supports for catalysts or for use in the adsorption of materials, especially in the adsorption of larger organic molecules, for example in industrial filtration, decolorisation, air filtration in respirators and air conditioning. In particular this invention relates to the production of fibrous activated carbon which may be in the form of filament, yarn, thread or tow, or as a woven or non-woven cloth.

Processes of producing fibrous activated carbons have been known for several years in which fibrous organic materials are first carbonised (pyrolysed) in an inert atmosphere to remove volatile matter, and are then activated by further pyrolysis to form the desired porous active surface in the carbonised fibrous material (char). Applicant's U.K. Pat. No. 1301101 describes one such process which produces a particularly strong, flexible, and highly activated fibrous carbon from fibrous carbohydrate starting materials, in which the starting materials are first pretreated by the incorporation therein of certain Lewis acids.

During the activation stage in the production of activated carbon, pores are formed in the char which dramatically increases it specific surface area and its adsorptive capacity, depending on the density of pores so produced. The size of the pores gradually increases the longer the char is exposed to the activating conditions, which has the desirable effects of increasing the activity of the char (ie increasing its ability to sorb substances rapidly) and further increasing the specific surface area of the char. However, it has been found that by employing these known processes of fibrous activated carbon manufacture, and in particular by employing the process of U.K. Pat. No. 1301101, the diameter of the pores cannot be increased to any significant extent beyond the micropore range (0 to 2 nm diameter), even if long exposure times are used. These known processes, therefore, produce essentially microporous carbons, that is to say carbons whose adsorption/desorption hysteresis isotherm is of Type 1 according to the classification of K. S. W Sing (Pure & Appl Chem 54 p.2201-2218, 1982). Furthermore, the weight loss of the char also increases with increasing exposure time to the activating conditions, which has the effect when activatating a fibrous char of reducing its tensile strength. Fibrous chars are therefore not normally activated beyond a char weight loss of about 70%.

One disadvantage of known processes for manufacturing activated carbons is, therefore, that it has not hitherto been possible to control the pore size distribution in the finished product other than by way of varying the general pore size (within the micropore range only) with exposure time to the activating conditions. This causes particular problems in the post-impregnation of activated carbons with catalyst materials such as metals, where it is particularly desirable to deposit the catalyst within the pores to promote strong bonding with the carbon and inhibit oxidative degradation of the catalyst. The optimum pore diameter for impregnating with metal catalyst in particular is found to lie in the range 2 to 50 nm (hereinafter referred to as mesopores) whereas, as stated above, the optimum pore diameter for known fibrous activated carbons is generally below 2 nm. Mesoporous materials, that is to say materials whose adsorption/desorption hysteresis isotherms are of Type IV according to the classification of Sing (vide supra), are therefore especially preferred as catalyst supports. Using known processes of fibrous activated carbon manufacture, it is not generally possible to produce a mesoporous activated carbon, even with a vey high char weight loss brought about by employing long exposure times to the activating conditions. For this reason, known fibrous activated carbons are generally found to have a mesopore content of less than about 10% of their total pore volume.

It is one object of the present invention to provide a method of preparing a fibrous activated carbon of high specific surface area and having an enhanced mesopore content which is thus more suitable for post-impregnation by catalyst materials. Other objects of the present invention will become apparent from the following detailed description thereof.

According to the present invention there is provided a method of preparing a fibrous activated carbon including the steps of carbonising and activating cellulose fibre at temperatures between 200° C. and 1000° C. in an inert atmosphere, characterised in that, prior to activation, the fibre is impregnated with an impregnating material comprising, in the form of one or more compounds, boron and at least one alkali metal.

The cellulose fibre may comprise either natural cellulose (such as cotton) or regenerated cellulose (such as viscose rayon and cuprammonium rayon). The diameter of the cellulose fibres used is not critical to the success of the process, but it is found that the smaller the diameter of the fibre the more flexible will be the carbonised product, and the higher will be its specific surface area. Typically, cellulose fibre diameters of 5–20 microns represents a good compromise between tensile strength and flexibility in the resulting fibrous activated carbon, and if the cellulose fibre is in the form of a woven or knitted cloth the activated carbon product is normally strong and flexible. The fibre may also be in the form of yarn, filament, thread, tow, non-woven cloth, web, felt, or fabric.

Where the impregnating material is in the form of a single compound, the compound will contain both boron and at least one alkali metal. Examples of such compounds are borax, sodium metaborate, sodium tetraborate, lithium metaborate, lithium pentaborate, lithium tetraborate, potassium tetraborate, or potassium metaborate. Where the material is in the form of two or more compounds, the material may consist of a mixture of one or more boron compounds and one or more alkali metal compounds. Examples of suitable boron compounds are boric acid, boric oxide, and other known boron compounds. Examples of suitable alkali metal compounds are alkali metal salts of mineral acids, especially alkali metal halides.

The impregnating material is preferably impregnated onto the fibre before carbonisation commences.

The impregnating material is preferably impregnated onto the fibre by contacting the fibre with a solvent in which the impregnating material is dissolved or suspended, and thereafter drying the fibre to leave the material impregnated thereon. Various solvents can be used for the impregnating material, preferably those which are easily removed during the various heating steps involved. Particularly preferred are water, methanol, ethanol, propanol, glycerol, acetone, isoamyl alcohol, ethylene glycol, mineral acids, formic acid and diethyl ether. The total concentration of boron compounds dissolved or suspended in the solvent is preferably between 0.1% and 5% w/v.

Where the fibre is impregnated prior to carbonisation, the amount of boron impregnated onto the fibre is preferably from 0.01% to 10%, most preferably from 0.1% to 5%, by weight of the fibre. Similarly, the amount of alkali metal impregnated onto the fibre is preferably from 0.01 to 10%, most preferably from 0.1% to 5%, by weight of the fibre. The atomic ratio of alkali metal to boron on the impregnated fibre is preferably from 0.1:1 to 1:0.1, most preferably from 0.2:1 to 1:0.2.

The fibre is preferably carbonised at a temperature between 200° C. and 600° C. and activated at a temperature between 450° C. and 1000° C., most preferably between 600° C. and 1000° C. The inert atmosphere will usually contain nitrogen, argon, hydrogen, carbon monoxide, carbon dioxide, combustion gases from hydrocarbon fuels, steam, or mixtures of these gases. These gases are favoured because they suppress the oxidation of the activated carbon during manufacture. The inert atmosphere preferably consists of or contains $CO_2$, steam, $H_2$ or mixtures therof during activation.

Activation times are generally from 1 to 150, preferably from 2 to 100, minutes in duration. Activation is preferably continued until the carbon has a BET surface area in excess of 500 $m^2 g^{-1}$.

Fibrous activated carbons prepared from cellulose fibre impregnated with impregnating materials in accordance with the present invention are generally found to possess a higher percentage of mesopores in their total pore volume than fibrous carbons prepared under similar conditions in accordance with the process described in U.K. Pat. No. 1301101. Typical mesopore contents of the present activated carbons are from 15% to 50%, more especially from 20% to 40%, of their total pore volumes. Furthermore, the present inventors have found that the presence of an alkali metal as well as boron in the impregnating material considerably increases activation rates and so reduces activation times, thus making possible much higher rates of carbon production and considerable savings in energy costs.

The present invention is especially suited to be performed by the process and apparatus described in U.K. Pat. No. 1310011 or the process of U.K. Pat. No. 1570677.

Figure 2:
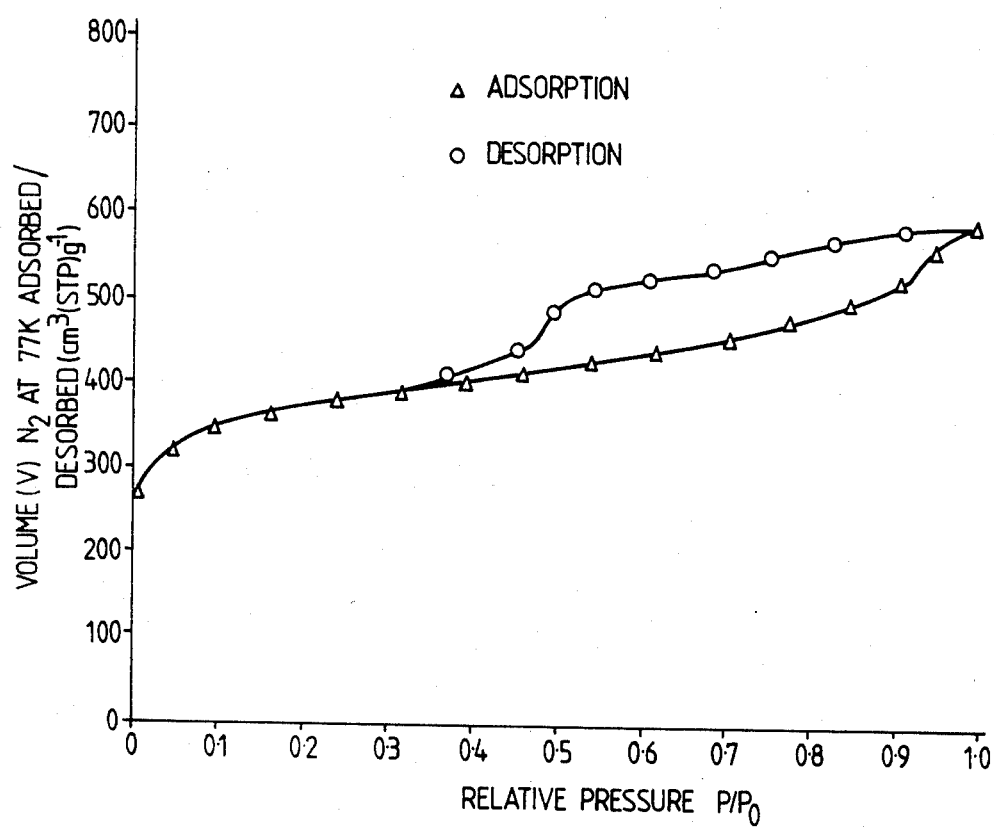
Figure 3:
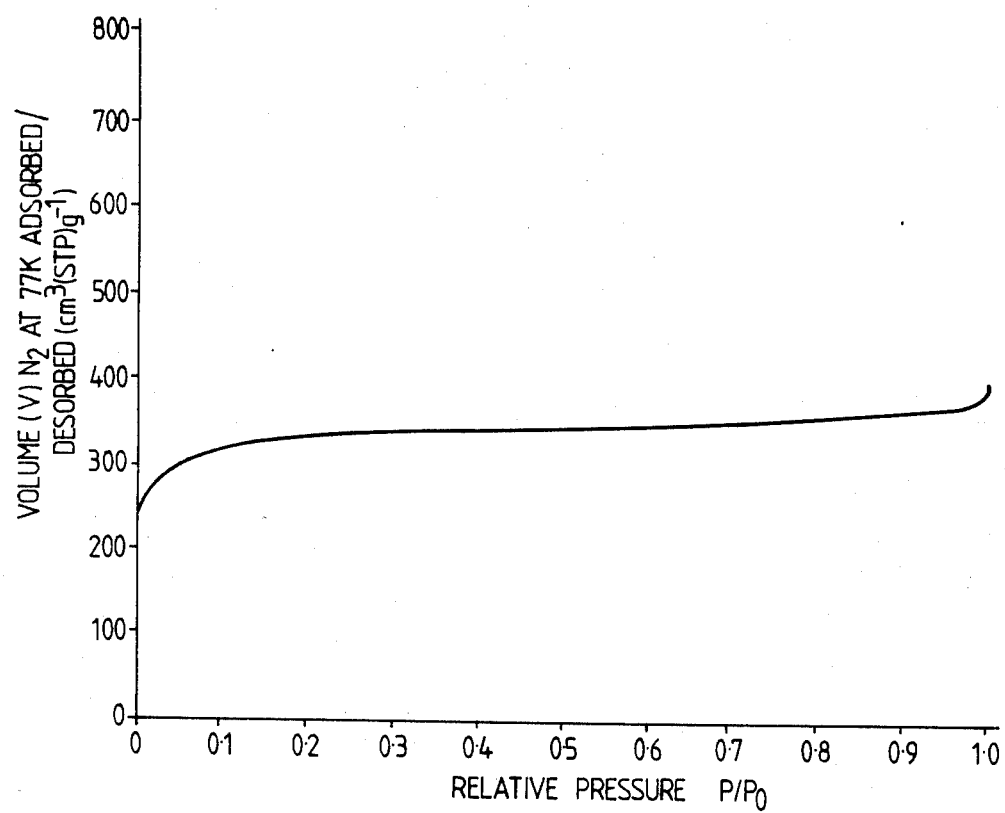
Figure 4:
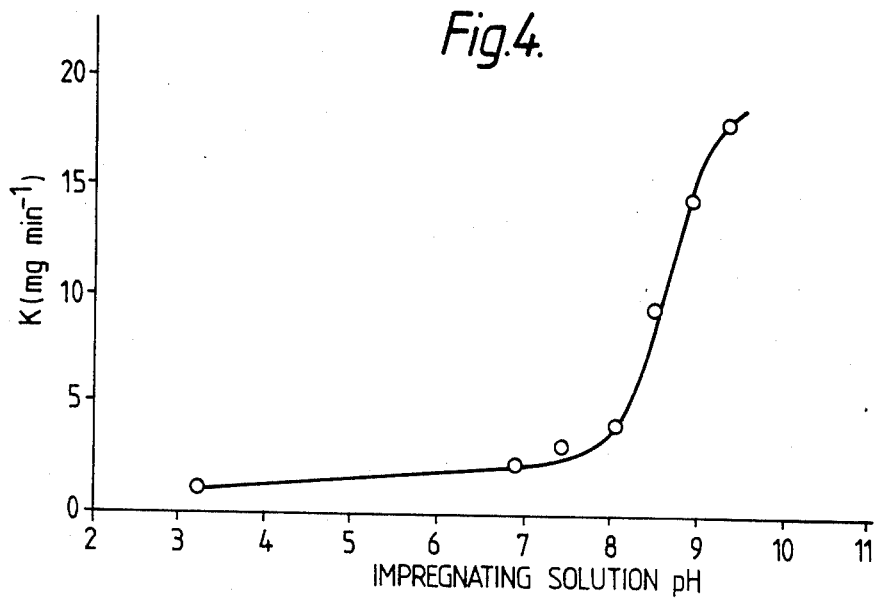
Figure 5:
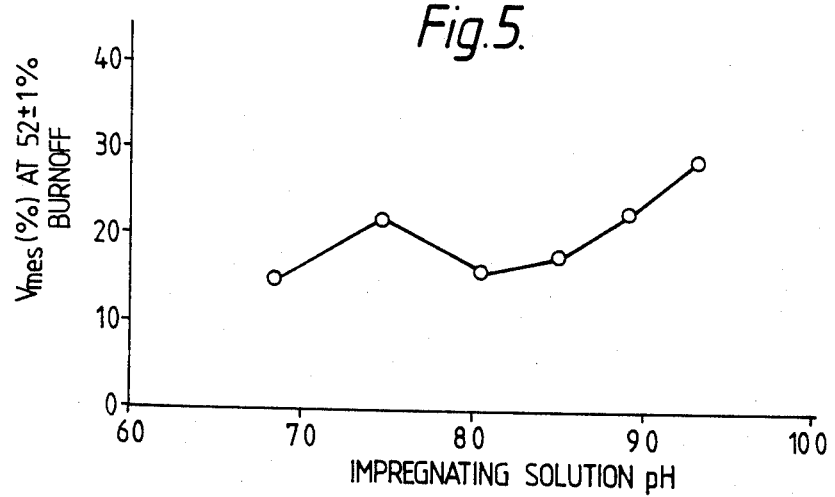

Methods of preparing activated fibrous carbon in accordance with the present invention will now be described by way of example only with reference to the accompanying drawings of which FIG. 1 is a graphical representation of weight loss of three samples of cellulose fibre against increasing temperature during carbonisation, FIG. 2 is a graphical representation showing an adsorption hysteresis isotherm at 77 K. obtained when nitrogen is adsorbed onto then desorbed from an activated fibrous carbon according to the present invention, FIG. 3 is a graphical representation showing by way of comparison with FIG. 2 an adsorption hysteresis isotherm at 77 K. obtained when nitrogen is absorbed onto and desorbed from a known activated fibrous carbon, FIG. 4 is a graphical representation showing the relationship between the rate of activation of fibrous activated carbons prepared in accordance with the present invention, and the pH of the impregnating solution used to impregnate with boron the cellulose fibres from which the activated carbons are made, and FIG. 5 is a graphical representation of the volume percentage of mesopores making up the total pore volume of fibrous activated carbons prepared in accordance with the present invention, and the pH of the impregnating solutions used to impregnate with boron the cellulosic fibres from which the activated carbons are made.

In each of the following Examples, a 20 cm×3.5 cm sample of Moygashel (registered Trade Mark) viscose rayon cloth (200 Denier, 12 warps and 12 wefts per cm) weighing about 1.5–2.0 g was immersed for 30 seconds in an impregnating solution. The sample was then removed, lightly pressed in blotting paper to remove excess impregnating solution, and dried in an oven at 55° C. The dried sample was then flexed by running each side six times over a 0.5 mm radius metal edge, and was subsequently pyrolyed in a stream of inert gas within a 3.8 cm internal diameter Donaldson vertical split tube furnace to produce an activate fibrous carbon product. The pyrolysing sample was suspended in the furnace from a calibrated Cahn RH electrobalance mounted on a frame above the funace tube, so that sample weight loss during pyrolysis could be continuously monitored.

Pyrolysis was commenced with a carbonisation stage in which the sample was heated up from ambient temperature at a rate of 10° C. min$^{-1}$ to 850° C. in a 4000 cm$^3$ min$^{-1}$ flowrate of $N_2$ furnace gas. This was followed by an activation stage in which the furnace gas was switched to $CO_2$ at the same flowrate, and the furnace temperature was maintained at 850° C. for various lengths of time. Particular note was taken of the weight of the sample after completion of the carbonisation stage, as subsequent weight loss during the activation stage was expressed as a percentage of this fully carbonised weight and is hereinafter referred to as "% burnoff". The rate of weight loss during activation is hereinafter referred to as "rate of activation" and is assigned the symbol "k".

EXAMPLE 1

(comparative)

A sample of the cloth was impregnated by immersion in an aqueous solution of 3% w/v aluminium chloride $AlCl_3$, 3% w/v zinc chloride $ZnCl_2$ and 3% ammonium chloride $NH_4Cl$. After drying and carbonisation, the sample was activated in the stream of $CO_2$ gas at 850° C. to 50% burnoff, and was then allowed to cool. Such a method of preparing activated carbon is in accordance with the invention described in British Pat. No. 1301101.

EXAMPLE 2

(comparative)

A sample of the cloth was impregnated by immersion in an aqueous solution of 3% w/v boric acid (pH 3.20). After drying and carbonisation, the sample was activated to 49.2% burnoff and was then allowed to cool. The observed rate of activation k was 1.15 mg min$^{-1}$.

EXAMPLE 3

(comparative)

The method of preparation of Example 2 was repeated except that the sample was activated, at the same rate of activation k of 1.15 mg min$^{-1}$ to 68.6% burnoff.

EXAMPLE 4

A sample of the cloth was impregnated by immersion in an aqueous solution of 2.5% w/v boric acid and 0.5% w/v borax (solution pH: 6.87). After drying and carbonisation, the sample was activated to 51.4% burnoff and was then allowed to cool. The observed rate of activation k was 2.25 mg min$^{-1}$.

EXAMPLE 5

A sample of the cloth was impregnation by immersion in an aqueous solution of 2.0% boric acid and 1.0% borax (solution pH: 7.48). After drying and carbonisation, the sample was activated to 51.6% burnoff at an observed rate of activation k of 3.0 mg min$^{-1}$, and was then allowed to cool.

EXAMPLE 6

A sample of cloth was impregnated by immersion in an aqueous solution of 1.5% boric acid and 1.5% borax (solution pH: 8.05). After drying and carbonisation, the sample was activated to 51.4% burnoff at an observed rate of activation of 4.10 mg min$^{-1}$, and was then allowed to cool.

EXAMPLE 7

A sample of the cloth was impregnated by immersion in an aqueous solution of 1.0% boric acid and 2.0% borax (solution pH: 8.50). After drying and carbonisation, the sample was activated to 51.5% burnoff at a rate of activation of 9.50 mg min$^{-1}$, and was then allowed to cool.

EXAMPLE 8

A sample of the cloth was impregnated by immersion in an aqueous solution of 0.5% boric acid and 2.5% borax (solution pH: 8.90). After drying and carbonisation, the sample was activated to 52.6% burnoff at a rate of activation of 14.5 mg min$^{-1}$, and was then allowed to cool.

EXAMPLE 9

A sample of the cloth was impregnated by immersion in an aqueous solution of 3% w/v borax (solution pH: 9.30). After drying and carbonisation, the sample was activated to 24.3% burnoff and was then allowed to dry. The observed rate of activation k was 18.0 mg min$^{-1}$.

EXAMPLES 10-13

The method of preparation of Example 9 was repeated except that the samples were activated, at the same rate of activation k of 18.0 mg min$^{-1}$, as follows: Example 10—30.6% burnoff, Example 11—52.8% burnoff, Example 12—70.8% burnoff, and Example 13—82.7% burnoff.

EXAMPLE 14

A sample of the cloth was impregnated by immersion in a mixed aqueous solution of 3.0% w/v boric acid and 0.25% w/v sodium chloride (solution pH: 4.0). After drying and carbonisation, the sample was activated to 51.5±0.1% burnoff and was then allowed to cool. The observed rate of activation k was 3 mg min$^{-1}$.

EXAMPLES 15-18

The method of preparation of Example 14 was repeated except that the concentration of sodium chloride in the mixed impregnating solution was varied. This was found to have some effect on the rate of activation k. The concentration of NaCl and its effect on k in each of the Examples 15-18 was as follows:

| Example | NaCl concentration % (w/v) | k mg min$^{-1}$ |
|---|---|---|
| 15 | 0.5 | 5 |
| 16 | 1.0 | 10 |
| 17 | 3.0 | 14 |
| 18 | 5.0 | 16 |

Further experimental data on Examples 1 to 18 above are given in Table 1 below:

TABLE 1

| Example | Carbonisation Yield (%) | Activation Time (mins) | Uptake of Na and B by rayon | |
|---|---|---|---|---|
| | | | % Na | % B |
| 1 | 28.6 | 46 | — | — |
| 2 | 24.4 | 157 | — | 1.6 |
| 3 | 24.1 | 213 | — | 1.6 |
| 4 | 25.7 | 110 | 0.18 | 1.0 |
| 5 | 25.4 | 82 | 0.15 | 0.7 |
| 6 | 24.8 | 53 | 0.21 | 0.8 |
| 7 | 26.8 | 29 | 0.31 | 0.6 |
| 8 | 25.8 | 19 | 0.42 | 0.6 |
| 9 | 24.8 | 3½ | 0.55 | 0.6 |
| 10 | 25.0 | 9 | 0.55 | 0.6 |
| 11 | 24.4 | 15 | 0.55 | 0.6 |
| 12 | 25.2 | 15 | 0.55 | 0.6 |
| 13 | 24.2 | 26 | 0.55 | 0.6 |
| 14 | 29.6 | 85½ | 0.16 | 0.6 |
| 15 | 30.7 | 53½ | 0.30 | 0.5 |
| 16 | 31.2 | 31½ | 0.44 | 0.6 |
| 17 | 31.6 | 20 | 1.19 | 0.5 |
| 18 | 29.1 | 18 | 1.93 | 0.4 |

Notes on Table 1
1. Weight loss after carbonisation (%) = 100 - carbonisation yield (%)
2. Uptake of Na and B by rayon is expressed as % by weight of the rayon, and was determined by atomic adsorption spectroscopy.

Sample weight loss with increasing temperature during the carbonisation stage of the above Examples 1 and 2 are illustrated graphically by line B and C respectively of FIG. 1. These lines indicate that both samples suffered a total carbonisation stage weight loss of 65-70%. Line A of FIG. 1 illustrate graphically the weight loss during carbonisation of a further sample of viscose rayon cloth which had not been impregnated beforehand. The further sample suffered a total carbonisation stage weight loss of 80-90%. These three lines A, B, and C demonstrate that sample of fibrous activated carbon prepared from fibres pre-impregnated with boron, like those prepared in accordance with the invention of GB 1301101, lose considerably less weight during carbonisation than fibrous activated carbon prepared from non-impregnated samples of cellulose fibre and so generally have superior mechanical properties, especially higher tensile strengths and greater flexibility.

Fibrous activated carbons produced in accordance with the above Examples were tested in order to determine the apparent surface area A (in m$^2$g$^{-1}$), the total pore volume V$_T$ (in cm$^3$g$^{-1}$) and the volume of micropores V$_{mi}$ and mesopores V$_{mes}$ (expressed as a perentage of V$_T$) for each carbon. The above values of A, V$_T$, V$_{mi}$ and V$_{mes}$ were obtained by drawing up adsorption/desorption hysteresis isotherms at 77 K. for each of the fibrous activated carbons. These isotherms were obtained by subjecting the carbon to an increasing pressure P of nitrogen gas (expressed as a fraction of the saturared vapour pressure $P_o$ of nitrogen at 77 K., ie $P/P_o$) so as to cause increasing amounts of nitrogen (expressed as $cm^3$ at STP of adsorbed $N_2$ per gram of carbon) to adsorb onto the carbon, and then decreasing the pressure of nitrogen to cause the nitrogen to desorb from the carbon.

FIGS. 2 and 3 illustrate two of these isotherms. FIG. 2 shows the adsorption/desorption hysteresis isotherm at 77 K. for one of the fibrous activated carbons prepared in accordance with the present invention (Example 11). FIG. 3 shows for the purpose of comparison an adsorption/desorption hysteresis isotherm at 77 K. obtained in the same way as the isotherm shown in FIG. 2, except that the fibrous activated carbon prepared for the purpose of comparison in accordance with Example 1 was used instead. The predominance of adsorption at low $N_2$ pressure in the isotherm of FIG. 3 indicates that most of the porosity of the carbon prepared in accordance with Example 1 is provided by micropores. This is supported by the isotherm classification of K S W Sing (Pure and Appl Chem 54 p 2201-2218, 1982), which by the shape of its isotherm classifies the carbon of Example 1 as a Type 1 microporous material. The shape of the isotherm in FIG. 2 indicates that the material is both mesoporous and microporous, having characteristics of both Type I and Type IV isotherms according to the classification of Sing vide supa.

From the $N_2$ isotherms drawn up for each of the fibrous activated carbons made in accordance with the above Examples, the apparent surface area A for each carbon was determined by the method of Brunnauer-/Emmett/Teller. $V_T$ for each carbon was calculated by the following equation I $$V_T = V_{0.95} 0.00156 \text{ cm}^3\text{g}^{-1} \quad \text{I}$$

where $V_{0.95}$ is a value read off the adsorption isotherm and is equal to the amount of nitrogen in $cm^3$(STP) per gram of carbon adsorbed at a P/Po value of 0.95. $V_{mi}$ (expressed as a percentage of $V_T$) was read from the same adsorption isotherm at corresponding P/Po values of 0.4. $V_{mes}$ was calculated by the following equation II $$V_{mes} = (100 - V_{mi})\% \quad \text{II}$$

The above simple procedure for calculating $V_{mi}$ and $V_{mes}$ was found to give results which closely approximated those calculated by the more complex procedures outlined by Sing vide supra.

The calculated values of A, $V_T$, $V_{mi}$, and $V_{mes}$ for each carbon are given in Table 2 below:

TABLE 2

| Example | $V_T$ ($cm^3g^{-1}$) | $V_{mi}$ (%) | $V_{mes}$ (%) | A ($m^2g^{-1}$) |
|---|---|---|---|---|
| 1 | 0.57 | 94 | 6 | 1271 |
| 2 | 0.48 | 89 | 11 | 939 |
| 3 | 0.76 | 89 | 11 | 1446 |
| 4 | 0.87 | 85 | 15 | 1676 |
| 5 | 0.70 | 78 | 22 | 1400 |
| 6 | 0.82 | 84 | 16 | 1549 |
| 7 | 0.70 | 92 | 18 | 1367 |
| 8 | 0.84 | 77 | 23 | 1423 |
| 9 | 0.45 | 92 | 8 | 917 |
| 10 | 0.51 | 81 | 19 | 1013 |
| 11 | 0.92 | 71 | 29 | 1408 |
| 12 | 1.12 | 57 | 43 | 1346 |
| 13 | 0.91 | 76 | 24 | 1292 |
| 14 | 0.83 | 84 | 16 | 1539 |
| 15 | 0.92 | 77 | 23 | 1499 |
| 16 | 0.84 | 71 | 29 | 1367 |
| 17 | 0.93 | 67 | 33 | 1339 |
| 18 | 0.83 | 70 | 30 | 1296 |

The above Table 2 shows that fibrous activated carbons prepared in accordance with the present invention possess a higher degree of mesoporosity than those prepared by the methods of U.K. Pat. No. 1301101, whilse also possessing a comparable apparant surface area and adsorbency.

The effect of impregnation solution pH on the samples of fibrous activated carbon made in accordance with the present invention may be seen in FIGS. 4 and 5. FIG. 4 illustrates graphically the relationship between rate of activation (at 850° in $CO_2$) and solution pH, for samples of carbon prepared in accordance with the above Examples 2, 4, 5, 6, 7, 8 and 9. FIG. 5 illustrates illustrates the relationship between $V_{mes}$ at $52 \pm 1\%$ burnoff and solution pH, for samples of carbon prepared in accordance with the above Examples 4, 5, 6, 7, 8, and 11. These two Figures demonstrate that both k and mesoporosity $V_{mes}$ increase steadily with increasing pH above an impregnating solution pH of about 8.0. Both k and $V_{mes}$ are also increased by the addition of an alkali metal halide eg sodium chloride to the impregnating solution (as indicated by the results of Examples 14-18 above) instead of or in addition to increasing solution pH.

The present fibrous activated carbons find uses as supports for catalysts, for example precious metal catalysts such as palladium. The carbons may be used to support catalysts used in the hydrogenation of fatty oils as described more fully in British Patent Specification Nos. 1578122 and 1578123. They may also be used in the structure of porous electrodes or as adsorbants, especially for larger molecules.

We claim:

1. A method of preparing a fibrous activated carbon which comprises the steps of
    (a) carbonizing cellulose fibre in an inert atmosphere at a temperature between 200° and 600° C., and
    (b) activating the carbonized cellulose fibre in an inert atmosphere at a temperature between 450° and 1000° C. until the fibrous activated carbon product has a BET surface area in excess of 500 $m^2g^{-1}$,
wherein prior to step (b) the cellulose fibre is impregnated with an impregnating material consisting of the elements boron and at least one alkali metal, said elements being in the form of one or more compounds, such that after impregnation the amount of alkali metal on the fibre is from 0.01 to 10% by weight of the fibre and the amount of boron on the fiber is from 0.01 to 10% by weight of the fibre, whereby the fibrous activated carbon product of step (b) has a mesopore content of at least 15% of its total pore volume.

2. A method according to claim 1 wherein the impregnating material comprises one or more compounds containing both boron and at least one alkali metal.

3. A method according to claim 2 wherein the impregnating material comprises one or more alkali metal borates.

4. A method according to claim 3 wherein the one or more alkali metal borates are selected from the group consisting of borax, sodium metaborate, sodium tetraborate, lithium metaborate, lithium pentaborate, lithium tetraborate, potassium tetraborate, and potassium metaborate.

5. A method according to claim 1 wherein the impregnating material comprises at least one boron compound and at least one alkali metal compound.

6. A method according to claim 5 wherein the at least one boron compound is selected from boric oxide and boric acid.

7. A method according to claim 5 wherein the at least one alkali metal compound comprises an alkali metal salt of a mineral acid.

8. A method according to claim 7 wherein the at least one alkali metal compound comprises an alkali metal halide.

9. A method according to claim 1 wherein the impregnating material comprises a mixture of at least one compound containing both boron and at least one alkali metal, with at least one compound selected from compounds of boron and compounds of alkali metals.

10. A method according to claim 9 wherein the impregnating material comprises a mixture of borax and boric acid.

11. A method according to claim 1 wherein the fibre is impregnated prior to carbonisation.

12. A method according to claim 1 wherein the atomic ratio of alkali metal to boron on the fibre after impregnation is from 0.1:1 to 1:0.1.

13. A method according to claim 1 wherein the impregnating material is impregnated onto the fibre by contacting the fibre with the material dissolved or suspended in a solvent, and thereafter drying the fibre to leave the material impregnated thereon.

14. A method according to claim 13 wherein the solvent is selected from the group consisting of water, methanol, ethanol, propanol, glycerol, acetone, isoamyl alcohol, ethylene glycol, mineral acids, formic acid, and diethyl ether.

15. A method according to claim 13 wherein the total concentration of boron compounds dissolved or suspended in the solvent is between 0.1% and 5% w/v.

* * * * *